United States Patent [19]

Samokovliiski et al.

[11] 4,305,537

[45] Dec. 15, 1981

[54] APPARATUS FOR FEEDING WIRE THROUGH GREAT DISTANCES

[75] Inventors: David A. Samokovliiski; Angel S. Angelov; Dimiter A. Ivanov; Simeon G. Punchev, all of Sofia, Bulgaria

[73] Assignee: Institute Po Technicheska Kibernetica I Robotika, Sofia, Bulgaria

[21] Appl. No.: 120,468

[22] Filed: Feb. 11, 1980

[30] Foreign Application Priority Data

Feb. 9, 1979 [BG] Bulgaria ................................ 42430

[51] Int. Cl.³ ............................................. B65H 17/20
[52] U.S. Cl. .................................................. 226/108
[58] Field of Search ............... 226/108, 109, 110, 111, 226/112

[56] References Cited

U.S. PATENT DOCUMENTS

| | | | |
|---|---|---|---|
| 3,124,290 | 3/1964 | Lloyd | 226/108 X |
| 3,387,759 | 6/1968 | Stedman | 226/108 |
| 3,679,864 | 7/1972 | Tanegashima | 226/108 |

*Primary Examiner*—Edward J. McCarthy

[57] ABSTRACT

An apparatus for feeding wire at great distances having wire-feeding mechanisms connected by thyristor stages with phase control to generators of ignition pulses, and supplied by a common supply bus to a speed stabilizer in the first wire-feeding device, connected to the wire-feeding mechanism and the generator of ignition pulses. In a first embodiment the output of the generator of ignition pulses of the first wire-feeding device is connected by means of a synchronization bus to the inputs of the generators of ignition pulses of the second and the next-following wire-feeding devices. In a second embodiment the inputs of the generators of ignition pulses of the second and the next devices are connected to the outputs of formers of synchronizing pulses, the inputs of which are connected to one of the supply buses.

4 Claims, 6 Drawing Figures

APPARATUS FOR FEEDING WIRE THROUGH GREAT DISTANCES

This application is related to application Ser. No. 99,898 filed Dec. 3, 1979, such application being a continuation-in-part of application Ser. No. 843,685, filed Oct. 9, 1977, now abandoned.

This invention relates to an apparatus for feeding wire through great distances for the purpose of welding in a protective atmosphere, the drive being effected by a DC motor operating under a condition of interrupted current.

A known wire-feeding apparatus comprises a wire-feeding mechanism, a thyristor stage, a generator for ignition pulses and a speed stabilizer. Such apparatus is disclosed and claimed in the above-referred to application Ser. No. 99,898, filed Dec. 3, 1979.

The drawbacks of such prior apparatus lie in that, the in-line connection of the different mechanisms results in a complex system for automatic regulation, featured by somewhat unstable operation. Moreover, the regulation of the power supplied to the motors is a function only of the current of the first feeding mechanism and requires, therefore, a higher coefficient of amplification in each of the following regulators, this being also a cause for unstable operation. The reduction of this coefficient of amplification leads to a different load distribution at different speeds, since the functional connection between the different regulators does not depend on the speed. Finally, the use of a regulator for each wire-feeding mechanism makes the system complex and expensive and reduces its overall reliability.

It is, therefore, a general object of this invention to provide an apparatus for feeding wire through great distances, which is featured by simplified layout, as well as to achieve a high quality regulation, thus achieving stable operation under conditions of equal loading of the different motors at all speeds, without mechanical slippage, and with a higher reliability.

This object is achieved by connecting the output of the generator of ignition pulses of the first wire-feeding device by means of a synchronization bus to the inputs of the generators of pulses of the second and the next wire-feeding devices. For a more stable operation and for an equal loading of the different motors, it is suitable to connect the inputs of the generators of ignition pulses of the second and the next wire-feeding devices to the outputs of the formers of synchronizing pulses, the other inputs of which are connected to one of the supply buses. Under nominal working conditions, the formers of synchronizing pulses comprise in their input a resistor, which is connected to one of the supply buses.

For improved operation with higher currents, the formers of synchronizing pulses cna comprise in their input a current transformer, the primary winding of which is connected to one of the supply buses.

The advantages of the invention lie in that the phase of triggering the thyristor in the regulator of the first device depends on load, as well as on the speed; thus there is produced a combined connection between the different regulators by current, as well as by speed. Moreover, the operation of the motor under a condition of interrupted current results in dropping characteristics of the electric drive of the second and the next mechanisms, and this prevents mechanical slippage, and by means of variation of the speed above or below the speed of the first motor there are provided conditions for such variation of the lengths of electrode wire between the different mechanisms which equalizes the loading of the different motors. After equalizing the loading of the different wire-feeding mechanisms, the speed of the next-following mechanisms is made equal to that of the first wire-feeding device, this influences decisively the quality of welding. The lack of speed stabilizers or of following systems in the second and the next wire-feeding devices results in more stable operation, since otherwise there would be obtained a system for automatic regulation of a higher level, composed of different closed systems for automatic regulation, connected by complex connections-variable mechanical connection and electric feedbacks. The lack of speed stabilizers or following systems in the second and the next devices results in a simplified and cheaper control system and to an increase of the overall reliability.

It is possible to connecte two, as well as three or more wire-feeding devices in the described manner.

For a better understanding of the invention, reference should be made to the accompanying drawings in which there is illustrated a preferred embodiment of the invention.

Figure 3:
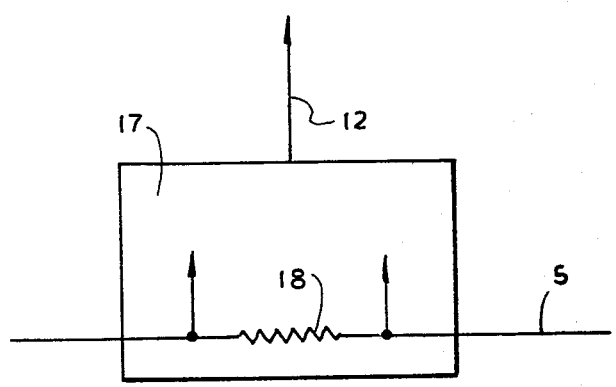
Figure 4:
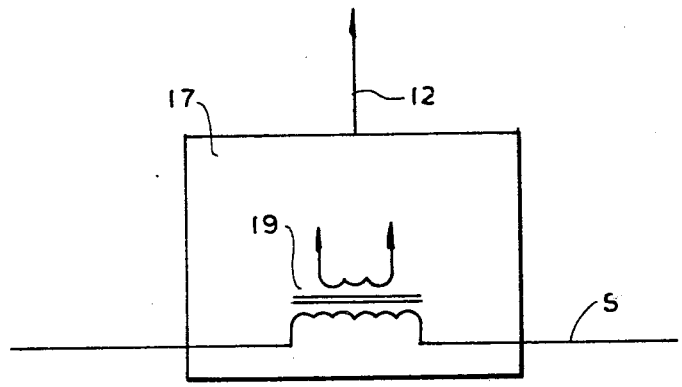
Figure 5:
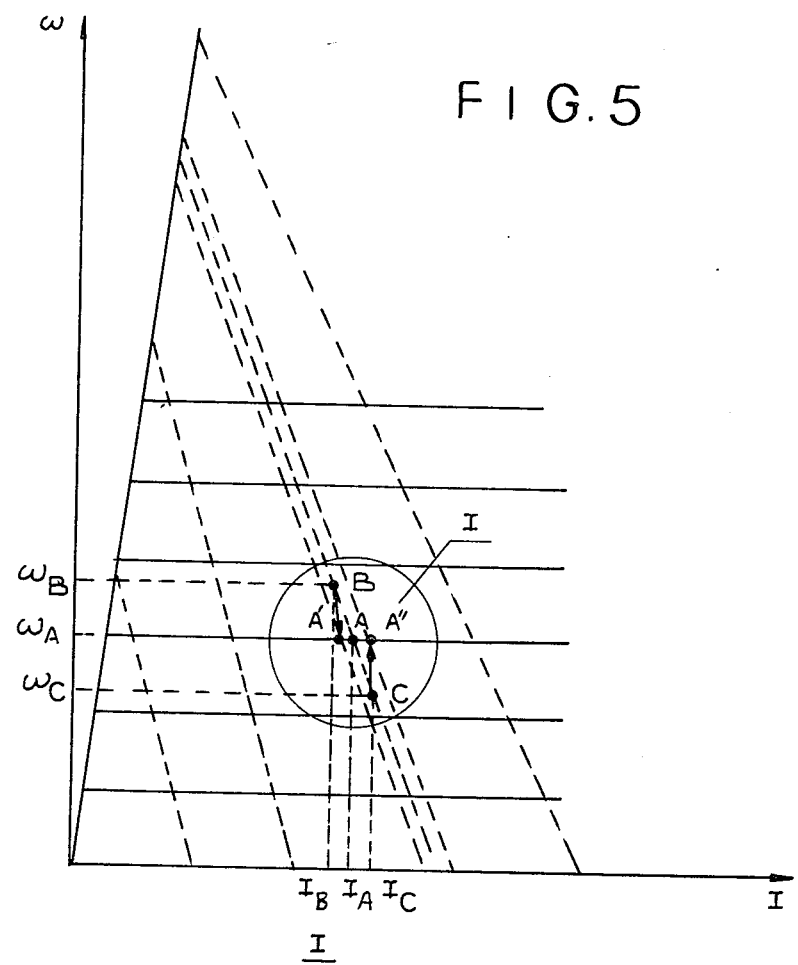
Figure 6:
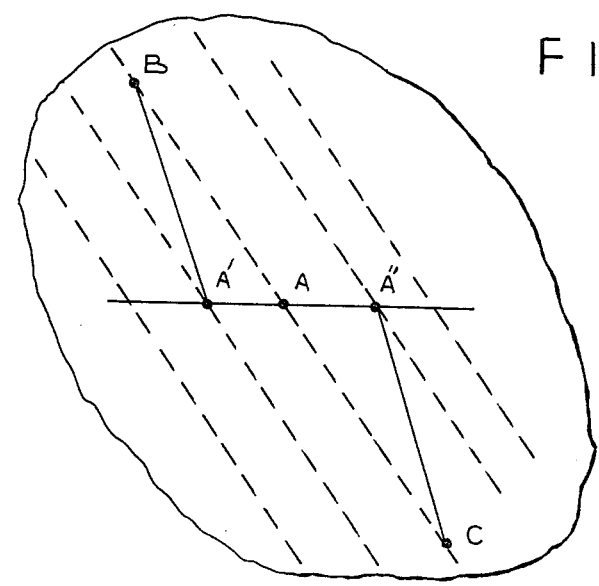

FIGS. 3 and 4, respectively, show the connection of two different, alternative formers of synchronizing pulses; and FIGS. 5 and 6, repsectively, show the characteristics of the first and the next wire-feeding devices.

Figure 1:
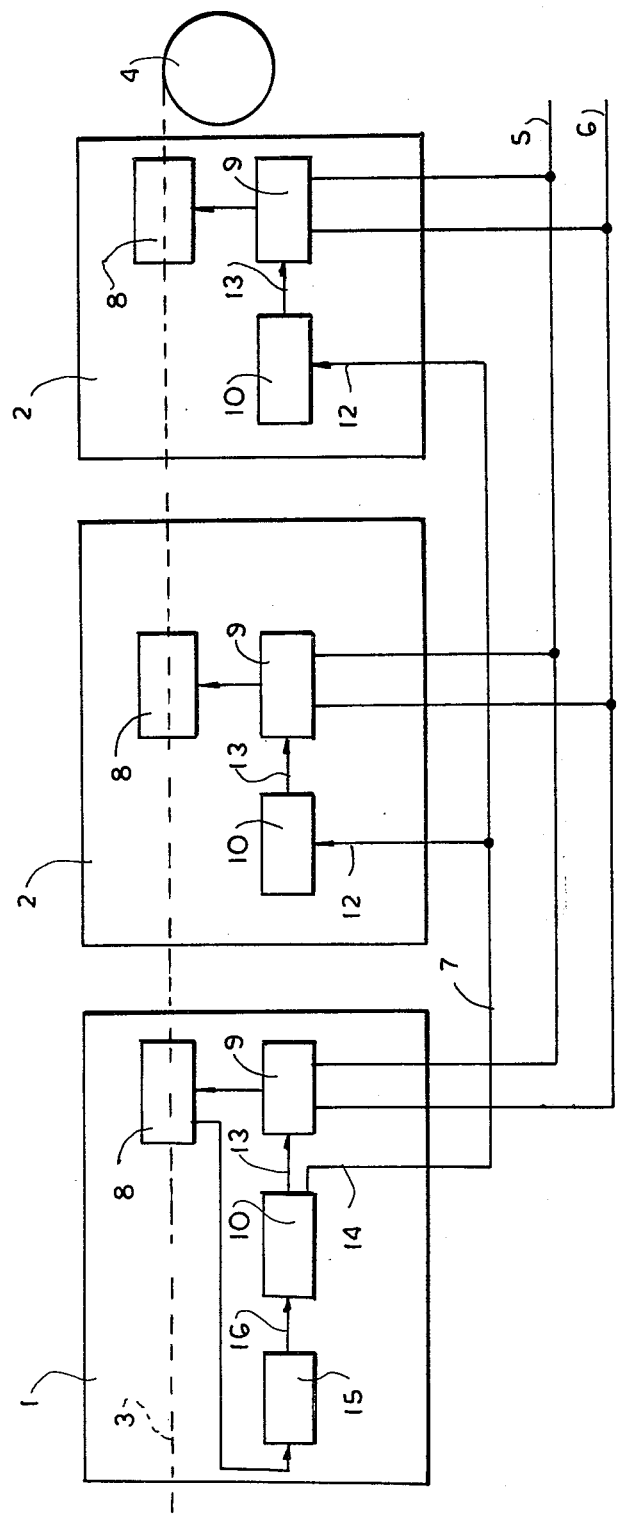
FIG. 1 is a schematic view showing a three in-line connected wire-feeding device with a special bus for synchronization.

Turning first to FIG. 1, it is seen in the drawing, that the first wire-feeding device 1 is connected to the preceeding wire-feeding devices 2 by means of the mechanical connection 3, which is the electrode wire itself, coming from reel 4, and two electrical connections 5 and 6, which are the supply buses. Moreover, the wire-feeding devices are also connected to a synchronization bus 7. Each wire-feeding device 1 or 2 comprises one wire-feeding mechanism 8, a thyristor stage 9 and a generator of ignition pulses 10. The generator of ignition pulses 10 has an input 12 for synchronizing pulses, an output 13 for ignition pulses, and an output 14 for synchronizng pulses. In the apparatus of FIG. 1, the latter output is necessary only in one case in the first wire-feeding device 1. The first wire-feeding device 1 also comprises a speed stabilizer 15, the input of which is connected to the wire-feeding mechanism 8, while its output is connected to the input 16 of the generator of ignition pulses 10. The output 13 of the generator of ignition pulses 10 of each wire-feeding device 1 or 2 is connected to the thyristor stage 9, and the latter is connected to the wire-feeding mechanism 8 supplying its respective motor, not shown. The inputs 12 of the generators of ignition pulses 10 of the second and the next wire-feeding devices 2 are connected by means of the synchronizing bus 7 to the synchronizing output 14 of the generator of ignition pulses 10 of the first wire-feeding device 1.

Figure 2:
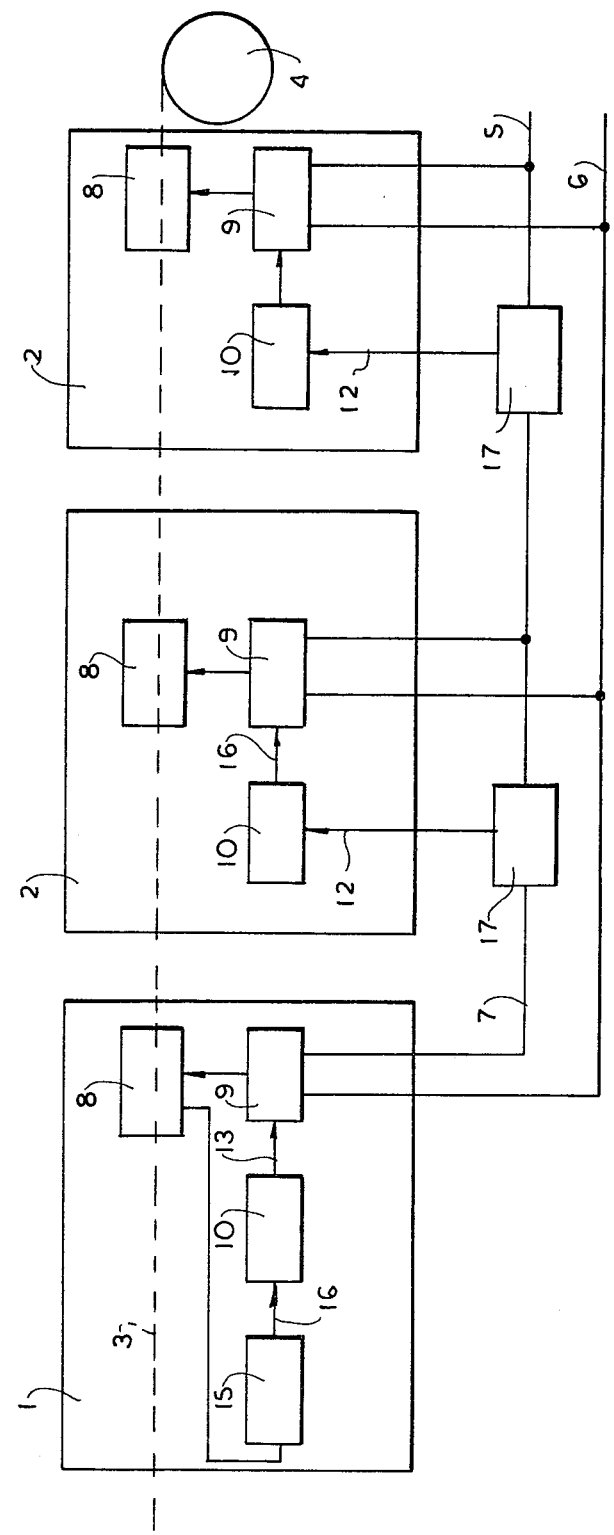
FIG. 2 is a schematic view showing three in-line connected wire-feeding devices with synchronizaion of the thyristor stages in accordance with the start of the current pulses of the first motor.

In the embodiment of FIG. 2 parts which are the same as those in FIG. 1 are designated by the same reference characters. In FIG. 2 the input 12 of the generators of ignition pulses 10 of the second and the preceeding wire-feeding devices 2 are connected by means of the synchronizing bus 7 to the synchronizing output of the former of synchronizing pulses 17, through which one (here 5) of the supply buses 5 or 6 passes.

The formers of synchronizing pulses 17 can be provided in their input with a resistor 18 (FIG. 3), connected in-series to the supply bus 5, as shown, or 6, and in this case they will react to the drop of voltage in this resistor. The formers of synchronizing pulses 17 can be provided with a current transformer 19 (FIG. 4), instead of with a resistor.

In each of the embodiments of FIGS. 1 and 2, the speed of th wire-feeding mechanism 8 of the first wire-feeding device 1, and thus also the speed of the electrode wire in the area of welding, are stabilized by the speed stabilizer 15. By means of synchronization bus 7, or the supply bus 5 or 6 and the former of synchronizing pulses 17, all generators of ignition pulses 10 are excited simultaneously; they produce ignition pulses and trigger simultaneously the thyristors of the thyristor stages 9. The electric time-constant of the motors is such, that they operate in condition of interrupted current. This, as well as the lack of stabilizers for the speed, provides for dropping characteristics of the motors of the wire-feeding mechanisms 8 of the second and the next wire-feeding devices 2.

Turning now to FIG. 5, let the preset speed be $\omega_A$. Then the working point A of the first wire-feeding device 1 will be somewhere along the horizontal line with ordinate $\omega_A$. It is assumed, that the first wire-feeding device 1 has pulled and stretched the greatest portion of the wire between itself and the second wire-feeding device 2. Then the latter is loaded less and its working point B lies on that characteristics which passes through point A. Its speed is higher and it starts to apply gradually a pushing force on an ever growing portion of wire in front, and thus it is loaded more and more and unloads the first wire-feeding device 1, until both devices are set in working point A' where they are equally loaded. On the contrary, if the second wire-feeding device 2 is more loaded and its working point is C, then it moves at lower speed, and the first wire-feeding device 1, moving at higher speed, pulls an ever growing portion of the wire between itself and the second wire-feeding device 2, and device 1 is thus loaded more and more while unloading the second wire-feeding device 2, until both are set in working point A. The operation of the next-following wire-feeding devices, which have the same characteristics as the second wire-feeding device 2, is analogous, as is evident in FIG. 6.

All thyristor stages 9, generators of ignition pulses 10 and speed stabilizers 15 of the first wire-feeding device 1 can be disposed in the last closest to the reel 4, wire-feeding device, or in the welding current source. Then their connection is effected according to the layout illustrated in FIG. 1.

A delay for additional correction can be effected in the generator of ignition pulses 10 of the first wire-feeding device, in the output 14, in the former of synchronizing pulses 17, or in any of the generators of ignition pulses 10 of the second and the next wire-feeding devices 2.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. In an apparatus for feeding wire at great distances, having wire-feeding mechanisms connected by thyristor stages with phase control to generators of ignition pulses, and supplied by a common supply bus to a speed stabilizer in the first wire-feeding device, connected to the wire-feeding mechanism and the generator of ignition pulses, the improvement wherein the output of the generator of ignition pulses of the first wire-feeding device is connected by means of a synchronization bus to the inputs of the generators of ignition pulses of the second and the next-following wire-feeding devices.

2. An apparatus for feeding wire at great distances according to claim 1, wherein the inputs of the generators of ignition pulses of the second and the next devices are connected to the outputs of formers of synchronizing pulses, the inputs of which are connected to one of the supply buses.

3. An apparatus for feeding wire at great distances according to claim 2, wherein each of the formers of synchronizing pulses comprises in its input a resistor which is connected in series to one of the supply buses.

4. An apparatus for feeding wire at great distances according to claim 2, wherein each of the formers of synchronizing pulses is provided in its input with a current transformer the primary winding of which is connected in series to one of the supply buses.

* * * * *